(12) United States Patent
Derby et al.

(10) Patent No.: US 9,811,287 B2
(45) Date of Patent: *Nov. 7, 2017

(54) HIGH-PERFORMANCE HASH JOINS USING MEMORY WITH EXTENSIVE INTERNAL PARALLELISM

(71) Applicant: International Business Machines Corporation, Armonk, NY (US)

(72) Inventors: Jeffrey H. Derby, Chapel Hill, NC (US); Charles L. Johnson, Fort Meyers, FL (US); Robert K. Montoye, New York, NY (US); Dheeraj Sreedhar, Bangalore (IN); Steven P. VanderWiel, Rosemount, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/749,730

(22) Filed: Jun. 25, 2015

(65) Prior Publication Data

US 2016/0147451 A1 May 26, 2016

Related U.S. Application Data

(63) Continuation of application No. 14/585,239, filed on Dec. 30, 2014.

(60) Provisional application No. 62/082,157, filed on Nov. 20, 2014.

(51) Int. Cl.
*G06F 12/00* (2006.01)
*G06F 3/06* (2006.01)
*G06F 17/30* (2006.01)
*G06F 13/16* (2006.01)

(52) U.S. Cl.
CPC .......... *G06F 3/0673* (2013.01); *G06F 3/0611* (2013.01); *G06F 3/0659* (2013.01); *G06F 17/30498* (2013.01); *G06F 13/1615* (2013.01)

(58) Field of Classification Search
CPC ................ G06F 3/0673; G06F 3/0611; G06F 17/30498; G06F 13/1615; G06F 3/0659
See application file for complete search history.

(56) References Cited

U.S. PATENT DOCUMENTS

2006/0116989 A1* 6/2006 Bellamkonda .... G06F 17/30489
2007/0233439 A1* 10/2007 Carroll ................ G06F 17/5022
703/6

* cited by examiner

*Primary Examiner* — Kalpit Parikh
(74) *Attorney, Agent, or Firm* — Cantor Colburn LLP

(57) ABSTRACT

In one embodiment, a computer-implemented method includes issuing, to a DRAM with EIP, a first group of two or more load requests to load data from a hash table constructed from hashed join-key values of a dimension table for a hash-join procedure. A second group of two or more load requests is issued. First response data is received, responsive to the first group of load requests. The first response data is processed while awaiting second response data responsive to the second group. Processing the first response data includes identifying matches between the join-key values corresponding to entries in the load requests of the first group and one or more hash buckets in the first response data. The size of the second group of load requests is selected such that a time for processing the first response data is approximately equal to the latency in receiving the second response data.

6 Claims, 8 Drawing Sheets

HIGH-PERFORMANCE HASH JOINS USING MEMORY WITH EXTENSIVE INTERNAL PARALLELISM

DOMESTIC PRIORITY

This application is a continuation of U.S. patent application Ser. No. 14/585,239 filed Dec. 30, 2014, which claims priority of U.S. Provisional Patent Application Ser. No. 62/082,157 filed Nov. 20, 2014, the disclosure of which is incorporated by reference herein in its entirety.

BACKGROUND

Various embodiments of this disclosure relate to database systems and, more particularly, to high-performance hash joins using memory with internal parallelism.

A join is a common and important relational database operation. Given two database tables and a selected column that appears in both, for each row in one table, a join seeks to extract the value in the selected column and to identify one or more rows in the second table that have the same value in this selected column. The result of the join is a table having rows that are a combination of those from the first and second table, each row having values joined across the tables due to a like value in the selected column. Not all columns from the corresponding rows need be included in the resulting table, depending on the details of the join instruction initiating the procedure.

The selected column on which the join is performed is referred to as the join key. The first table is referred to herein as the fact table, and the second table is referred to herein as the dimension table.

A common approach to implementing joins is through a technique known as a hash join. A hash join procedure generally includes two phases: (a) build the hash table (i.e., the build phase); and then (b) probe the hash table (i.e., the probe phase). In the build phase, a hash table is constructed from hashed join-key values from the dimension table. Within a row of the hash table corresponding to a row of the dimension table, a pointer to the corresponding row or desired data from the corresponding row may be included in the hash-table entry and used to assist in the join. In the probe phase, values of the join key are read from the various rows of the fact table and then hashed, and the corresponding hash-table entry is retrieved from memory and examined to see if it contains the join-key value from the fact table. If there is a hit in the hash table, a join is performed with selected data from the appropriate rows in the fact table and the dimension table.

Efficient implementation of join algorithms is critical for the performance of many database queries. For hash joins, as for other join algorithms, overall performance is often affected by the potentially large amount of data in the two tables. If the two tables are stored in a columnar format, storage of join-key values for successive rows is generally adjacent in memory. Thus, reading entries from the dimension table during the build phase and from the fact table during the probe phase can operate at speeds approaching peak memory bandwidth limits, given mechanisms such as hardware prefetch, which enable efficient sequential accesses to external dynamic random-access memory (DRAM).

Accesses into the hash table during the probe phase, however, are data-dependent and random, due to the use of hash functions. Double-data-rate (DDR) DRAM cannot efficiently support large numbers of data-dependent random read requests, because of the limited number of internal responders, or banks, that can extract data from the DRAM cells in parallel. Moreover, because the read requests are data-dependent and random and the hash table can be large, even caches as large as 100 MB provide little or no benefit unless extensive additional work is done to partition the hash table. Thus, the data-dependent random accesses to the hash table dominate in the performance of hash joins.

Recently, DRAM has become available in a form that provides a dramatic increase, by one to two orders of magnitude, in the number of responders that can operate in parallel inside the DRAM. One example is the so-called "hybrid memory cube" (HMC), described in a specification from the Hybrid Memory Cube Consortium. HMCs are expected to be available with 256 independent responders in a 4 GB DRAM structure. The present disclosure refers to DRAM configurations that incorporate relatively large numbers of independent responders as "DRAM with extensive internal parallelism," or "DRAM with EIP," and the term "DRAM" herein can refer to various types of DRAM, including, for example, DRAM with EIP. For example, and not by way of limitation, DRAM with EIP may have the following characteristics: (1) a large number of responders, such as two hundred or more but fewer may also be acceptable, that can return data in parallel, with differential latencies that are small compared with the bulk latency for a single isolated read request; and (2) high aggregate interface bandwidth (e.g., for the Micron HMC, this can exceed 200 GB/s aggregated over several physical links).

SUMMARY

In one embodiment of this disclosure, a computer-implemented method includes issuing, to a DRAM with EIP, a first group of two or more load requests to load data from a hash table comprising one or more hash buckets. The hash table is constructed from hashed join-key values of a dimension table for a hash-join procedure. Each load request in the first group corresponds to an entry in a fact table of the hash-join procedure and seeks a hash bucket matching a hashed join-key value for the corresponding entry in the fact table. A second group of two or more load requests is issued to the DRAM with EIP to load data from the hash table. First response data is received, from the DRAM with EIP, where that first response data is responsive to the first group of load requests, and where the first response data includes one or more hash buckets from the hash table. The first response data is processed, by a computer processor, while awaiting second response data that is responsive to the second group of load requests. Processing the first response data includes identifying matches between the join-key values corresponding to entries in the two or more load requests of the first group and the one or more hash buckets in the first response data. The size of the second group of two or more load requests is selected such that a time for processing the first response data is approximately equal to the latency in receiving the second response data.

In another embodiment, a system includes a memory and one or more processor cores communicatively coupled to the memory. The one or more processor cores are configured to issue, to a DRAM with EIP, a first group of two or more load requests to load data from a hash table comprising one or more hash buckets. The hash table is constructed from hashed join-key values of a dimension table for a hash-join procedure. Each load request in the first group corresponds to an entry in a fact table of the hash-join procedure and seeks a hash bucket matching a hashed join-key value for the corresponding entry in the fact table. The processor cores are further configured to issue, to the DRAM with EIP, a second group of two or more load requests to load data from the hash table. The processor cores are further configured to receive, from the DRAM with EIP, first response data that is responsive to the first group of load requests, where the first response data includes one or more hash buckets from the hash table The processor cores are further configured to process the first response data while awaiting second response data that is responsive to the second group of load requests. Processing the first response data includes identifying matches between the join-key values corresponding to entries in the two or more load requests of the first group and the one or more hash buckets in the first response data. The size of the second group of two or more load requests is selected such that a time for processing the first response data is approximately equal to the latency in receiving the second response data.

In yet another embodiment, a computer program product for managing a hash-join procedure includes a computer readable storage medium having program instructions embodied therewith. The program instructions are executable by a processor to cause the processor to perform a method. The method includes issuing, to a DRAM with EIP, a first group of two or more load requests to load data from a hash table comprising one or more hash buckets. The hash table is constructed from hashed join-key values of a dimension table for a hash-join procedure. Each load request in the first group corresponds to an entry in a fact table of the hash-join procedure and seeks a hash bucket matching a hashed join-key value for the corresponding entry in the fact table. Further according to the method, a second group of two or more load requests is issued to the DRAM with EIP to load data from the hash table. First response data is received, from the DRAM with EIP, where that first response data is responsive to the first group of load requests, and where the first response data includes one or more hash buckets from the hash table. The first response data is processed while awaiting second response data that is responsive to the second group of load requests. Processing the first response data includes identifying matches between the join-key values corresponding to entries in the two or more load requests of the first group and the one or more hash buckets in the first response data. The size of the second group of two or more load requests is selected such that a time for processing the first response data is approximately equal to the latency in receiving the second response data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are join systems and methods that leverage the features of DRAM with EIP to perform joins more efficiently and, more specifically, to perform the probe phase of joins more efficiently. Some embodiments of the present join system restructure the traditional probe phase of a hash-join algorithm to achieve five-times to ten-times increases in performance for hash probes over the best-reported results. The join system may achieve this at competitive power and cost and running on general-purpose processor cores with traditional or near-traditional programming models.

An embodiment of the join system may organize the work so that read requests, also referred to herein as load requests (i.e., requests to load data from the DRAM to one or more registers of the processor core 130 or a local cache of the processor core 130), per processor thread are grouped and issued in such groups. The load requests may be, for example, explicit load instructions or software-directed prefetch instructions. Each load request may correspond to one entry in the fact table and may seek a hash bucket matching the hashed join-key value for that corresponding entry. As a result of the grouping, the latency for responses from external memory can be covered with useful work, even when the work to be done per load request is small, as it is for hash probes. DRAM with EIP may be an enabling technology because the aggregate latency from a group of load requests (i.e., the time to load data in response to such requests) is not much larger than that from a single load request in isolation, even for groups containing tens of requests.

As will be discussed further below, the join system may employ a form of software pipelining. Software pipelining is a technique for mitigating the impact of certain latencies in executing code. Embodiments of the present join system may use software pipelining with a novel algorithm. Specifically, groups of load requests may be pipelined, where each request targets a different data-dependent address. This may enable the DRAM with EIP to be treated as a large cache. The join system may efficiently organize the work in the probe phase of a hash join to take advantage of the characteristics of the DRAM with EIP, such that software pipelining can be used and significant performance benefits can be realized as a result.

Figure 1:
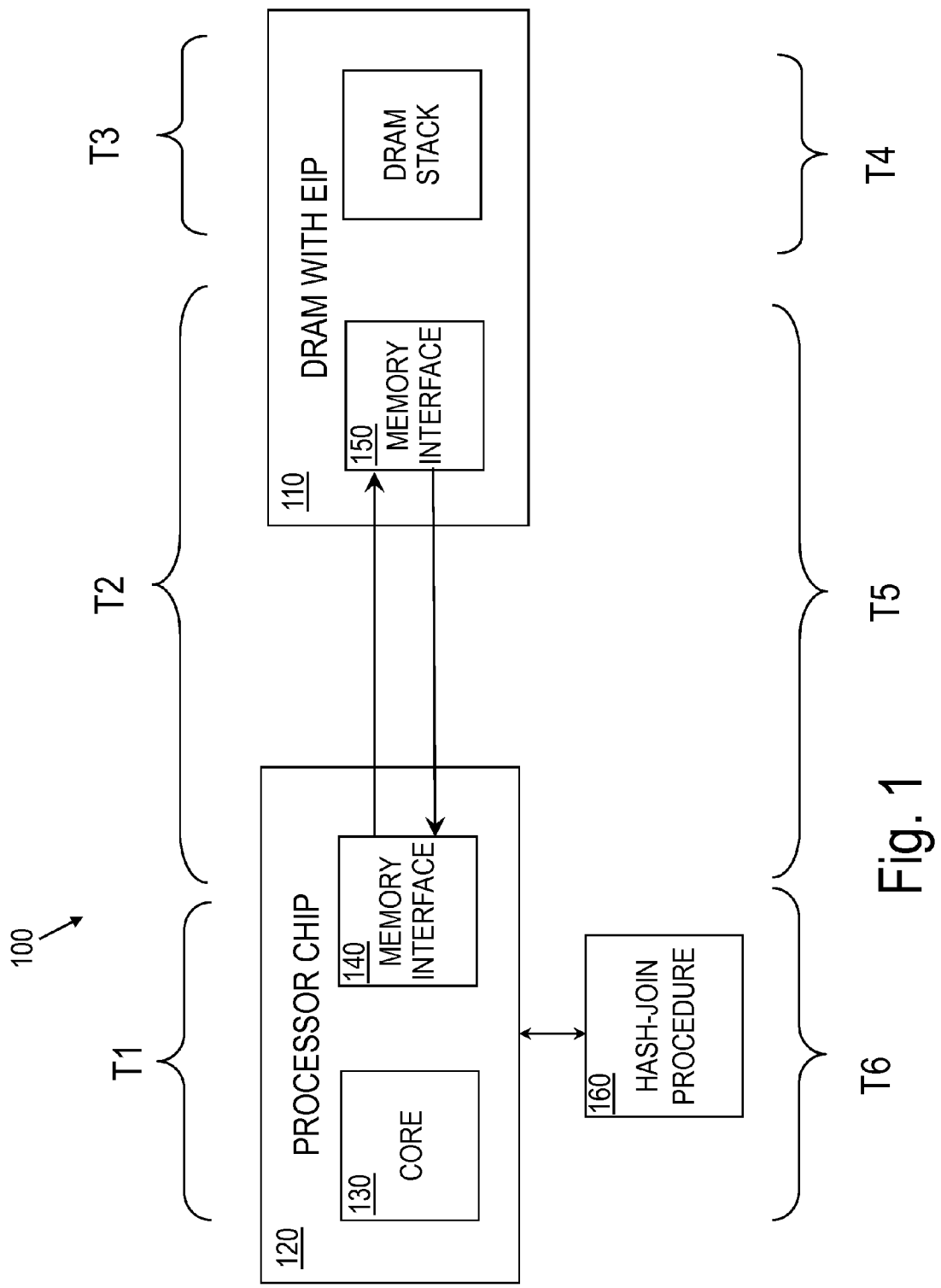
FIG. 1 is a block diagram of a join system, according to some embodiments of this disclosure.

FIG. 1 is a block diagram of the join system 100, according to some embodiments of this disclosure. As shown, in the join system 100, a hash-join may be performed by using a DRAM, such as a DRAM with EIP 110. A computer processor 120, including one or more cores 130, may use processor threads to make groups of load requests, where the requests are made from the memory interface 140 of the processor 120 to the memory interface 150 of the DRAM with EIP 110. In response to each group of load requests, data may be loaded from the memory interface 150 of the DRAM with EIP 110 to registers in the processor cores 130. In some embodiments, there may be two or more parallel interface channels between the DRAM with EIP 110 and the processor chip 120, and these channels may be used to transmit the load requests and the responsive data. With the responsive data having been loaded, a desired hash-join procedure 160 may be performed as further described below. It will be understood that configurations such as the one shown in FIG. 1 may include other forms of external DRAM (e.g., DDR) connected to the processor 120.

FIG. 1 also defines some time spans for handling load requests for a join operation, and these definitions will be used throughout this disclosure. As shown, time $T_1$ represents the time for a load requests to issue and flow to the memory interface 140 of the processor 120; time $T_2$ represents the time in transit of a load request between the memory interface 140 of the processor 120 and the memory interface 150 of the DRAM with EIP 110; together, time $T_3$ and time $T_4$ sum together to represent the DRAM internal array access time; time $T_5$ represents the transit time, of data responsive to a load request, from the memory interface 150 of the DRAM with EIP 110 to the memory interface 140 of the processor 120; and time $T_6$ represents the time for that data to be transmitted from the memory interface 140 of the processor 120 to a processor core 130.

Figure 2:
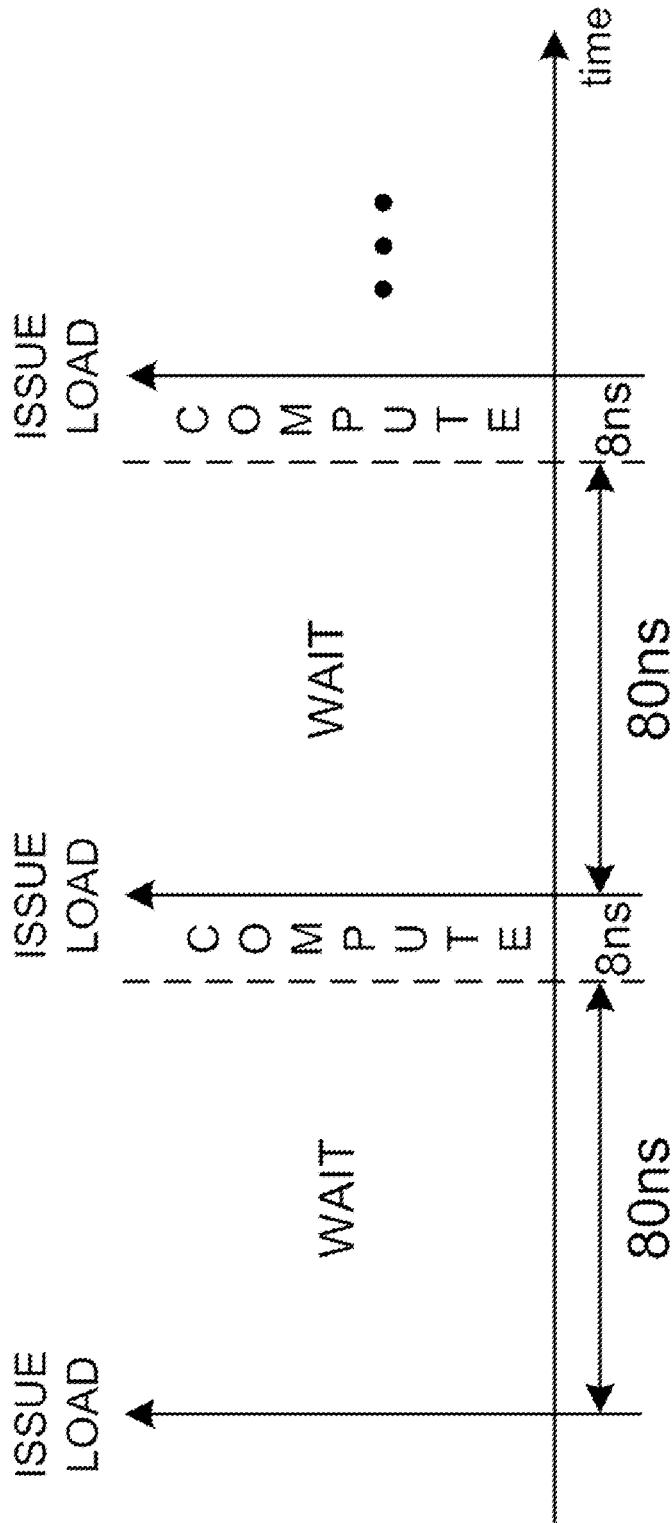
FIG. 2 illustrates the behavior of a conventional join system when handling load requests.

To perform a hash join, a processor thread may issue a load request to probe a hash table, which may be implemented in part by loading data from the DRAM with EIP 110. In an example from a conventional system, the latency from the load request (i.e., from the time a load request is issued by the processor thread to the time when the data returned is available in the processor core) is 80 nanoseconds (nsec), and the time to process the data returned in response to the request is 8 nsec. The time to process may generally be smaller than the time to load, because there is usually little work to do per probe into the hash table. To issue one load request and then process the result, a conventional system would have the behavior shown in FIG. 2. As shown there, the issuing thread spends most of its time stalled, waiting for data to be returned from the DRAM. Using conventionally structured probe techniques, this would be the result for DRAM with EIP as well as for ordinary DDR DRAM.

To improve performance for hash probes, embodiments of the join system 100 may seek to eliminate the stalls and cover the latency for hash-table accesses with useful work. Example behavior of the join system 100 is shown in FIG. 3, which illustrates the more effective use of time according to some embodiments of this disclosure.

In contrast to conventional systems performing hash joins, in some embodiments of this disclosure, load requests made by a thread to the hash table in the DRAM with EIP 110 may be issued in groups, with the groups being large enough so that the aggregate latency from a group of load requests can be filled with useful work processing the data received as responses to the previous group of load requests. The groups of load requests may be large enough that the time to process the results returned by the group of load requests may cover the aggregate latency. The join system 100 may use a form of software pipelining to ensure that useful work occurs during the latency.

Figure 3:
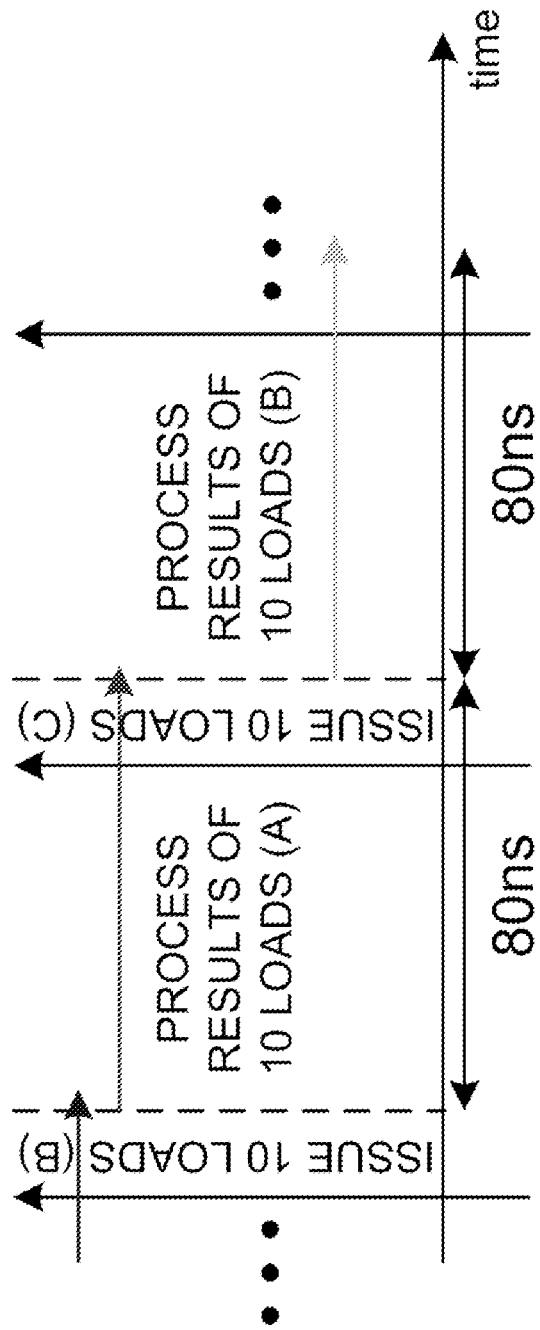
FIG. 3 illustrates the behavior of a join system handling load requests, according to some embodiments of this disclosure.

The behavior shown in FIG. 3 may be realized using DRAM with EIP 110, but may not be possible with ordinary DRAM. Some embodiments depend on the extensive internal parallelism available in DRAM with EIP 110, which may enable the aggregate latency from a group of load requests to be not much larger than the latency from a single load request in isolation. For simplicity, FIG. 3 illustrates ideal behavior, with the aggregate latency for a group of ten load requests being the same as the latency for the single load request in FIG. 2. In practice, however, the aggregate latency for a group of multiple load requests may be larger than the latency for a single load request, but using DRAM with EIP 110, this difference may be small.

The load requests may be issued by threads of the processor core 130. In some embodiments, the load requests may be nominally issued on back-to-back processor cycles or, equivalently, at the maximum rate at which threads can issue them. The join system may aim for the requests arrive at the memory controller for the DRAM with EIP 110 with minimum differential latency. There may be a component of the aggregate latency, from a group of load requests, that scales linearly with the number of requests in the group. Having a thread issue the requests at the maximum possible rate may be a means of reducing or minimizing this component and thus also reducing or minimizing the differential latency for responses to successive load requests within the group.

The probe work may be organized to enable the issuing of groups of load requests as described above, with the work being split in two sub-phases. In a first sub-phase, a quantity of entries (e.g., 1000 entries) may be read from the fact table, the join key values may be hashed, and the corresponding addresses of hash-table entries may be saved along with the join-key values and pointers to the rows or other appropriate data. For example, this data may be saved in one or more arrays. The arrays created in this phase, which may include addresses of hash-table entries and join-key values, as well as pointers or other data, may be viewed as a work queue.

In a second sub-phase, groups of load requests may be passed to the DRAM with EIP 110 containing addresses of hash-table entries taken from the work queue, and the responses to the requests may be processed in the usual way of processing joins, e.g., determining whether the join-key value in the hash-table entry matches the join-key value in the fact-table entry. If there is a hash collision and one or more additional hash-table entries must be read for the same fact-table entry, each additional load request may be scheduled as part of later groups of load requests to the DRAM with EIP 110 by adding the data associated with the additional load request to the work queue. Thus, an efficient organization of the hash-probe work may by be maintained.

Below is an abstract pseudocode version of a hash-probe algorithm per thread, with the work organized according to some embodiments of the join system 100. In the below example code, it is assumed that: (a) there are $N_{ft}$ entries to be read from the fact table; (b) there are $N_{blk}$ entries read from the fact table for each pass through the first sub-phase; and (c) there are $N_{rr}$ load requests in each group issued during the second sub-phase. The pseudocode, which is an example and may be imprecise with respect to some details, is as follows:

```
initialize pointers to the fact table;
do for n = 0 to (N_ft/N_blk)-1;
    // begin first sub-phase
    initialize the work-queue arrays to proper size and null content;
    // if necessary
    do for m = 0 to (N_blk)-1;
        read the next entry from the fact table;
        hash the join-key value and generate the address of the
corresponding entry in the hash table;
        place this address, the join-key value, and other appropriate
info in the next work-queue entry;
    end do for m;
    // begin second sub-phase
    issue N_rr load requests to the hash table using the first N_rr entries
in the work queue;
    do until the work queue is empty;
        issue N_rr load requests to the hash table using the next N_rr
entries in the work queue;
        do for each of the responses to the previous group of load
        requests issued;
            decrement the work-queue size by 1;
            compare the join-key value in the hash table entry with
that in the corresponding work-queue entry;
            if there is a match, then;
                effect the join for the fact-table and dimension-table
entries and write the output;
                else if there is another hash-table entry for the particular
hash value, then;
                    generate the address of the next hash-table entry
for the particular hash value;
                    place this address, the join-key value, and other
appropriate info on the work-queue;
                        increment the number of work-queue entries by 1;
                end if;
        end do for each;
    end do until
end do for n;
```

The hash-probe algorithm, such as that represented by the pseudocode above, may apply to each thread, and may be executed by many threads in parallel. For example, and not by way of limitation, each thread may operate on a distinct, associated subset of the fact table. The hash-probe process may differ from thread to thread, and may depend on hash-table structure as well as construction and management of the work queue. In general, however, each thread may partition work into the two sub-phases, as described above, and may issue load requests in groups to the hash table in the DRAM with EIP 110. This partitioning may enable creation of load request groups of appropriate size and also, if the work queue is large enough, may enable sorting and selection of groups of entries in the work queue to reduce differential latencies due to internal contention in the DRAM with EIP 110.

The quantity of load requests in each group may be determined such that the aggregate latency, until responses are received to all requests in the group, is covered by the work to process the data responsive to the requests. This quantity of load requests per group may be calculated by many means, such as, for example, through trial and error in designing an embodiment of the join system 100 to operate with a particular DRAM with EIP 110. In some embodiments, the size of a group of load requests may be determined dynamically. In that case, the size of the groups can be adjusted upward if processing requests takes less time than receiving the responses, and the size may be adjusted downward if the processing takes more time than receiving the responses. In some other embodiments, the quantity of load requests may be selected through a mechanism described below.

There may be trade-offs associated with the size of the work queue, which is the value of the parameter $N_{blk}$ in the pseudocode. If the work queue is large, it may occupy a significant fraction of the L1 data cache or other storage local to a processor core 130. A large work queue can provide benefits as well. For example, with a large work queue, it may be possible, at the beginning of the second sub-phase, to order the hash-table addresses in the work queue. This may assist in efficiently selecting addresses in the DRAM with EIP 110 to be accessed for each group of load requests. The join system 100 may seek to effectively utilize the parallelism within the DRAM with EIP 110 and the parallelism for return of data from the DRAM with EIP 110, i.e., parallel links between the DRAM and the processor chip and parallel paths internal to the processor chip 120. This may require finding an appropriate work queue size.

Work queue size may be related to the size of groups of load requests, since the load requests come from the work queue, in some embodiments. Finding an appropriate work queue size may involve estimating latency for handling a group of load requests. This estimation may be performed through various mechanisms. For example, consider a computer system with the following characteristics: one core and one thread issuing load requests; contention for shared resources in the processor chip is ignored; 64 B are returned from DRAM per load request; four links carry data from the DRAM to the processor chip; there exists one path within the processor chip for dataflow from the memory interface to the requesting core; load requests in a group are issued by a thread in back-to-back cycles, and they flow in a pipelined fashion through the processor chip and across the links to the DRAM; responses to requests in a group are distributed across the four links from the DRAM; the processor chip clock is 1 GHz, which is uniform for cores and the system bus; and the DRAM per-link bandwidth is 16 GB/sec.

Figure 4:
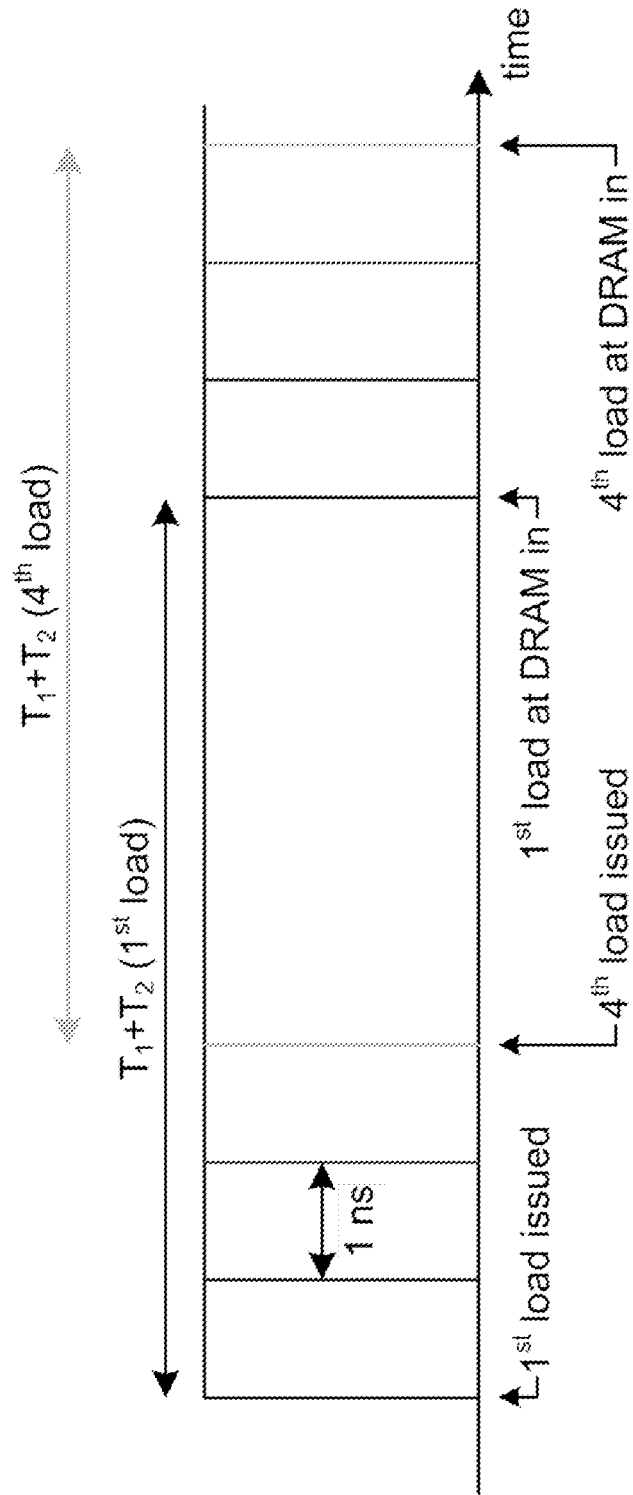
FIG. 4 illustrates the timing for a group of four load requests to flow from a processor core to a DRAM, according to some embodiments of this disclosure.

In this example, FIG. 4 illustrates an outbound path, from the core 130 to the DRAM, in handling the first four requests in a group. More specifically, FIG. 4 shows the timing for a group of four load requests to flow from a processor core 130 to the DRAM. In this example, the processor chip clock period is assumed to be 1 nsec, as per the above, and load requests are issued 1 nsec apart. Thus, the load requests arrive at the DRAM spaced at 1-nsec intervals.

Figure 5:
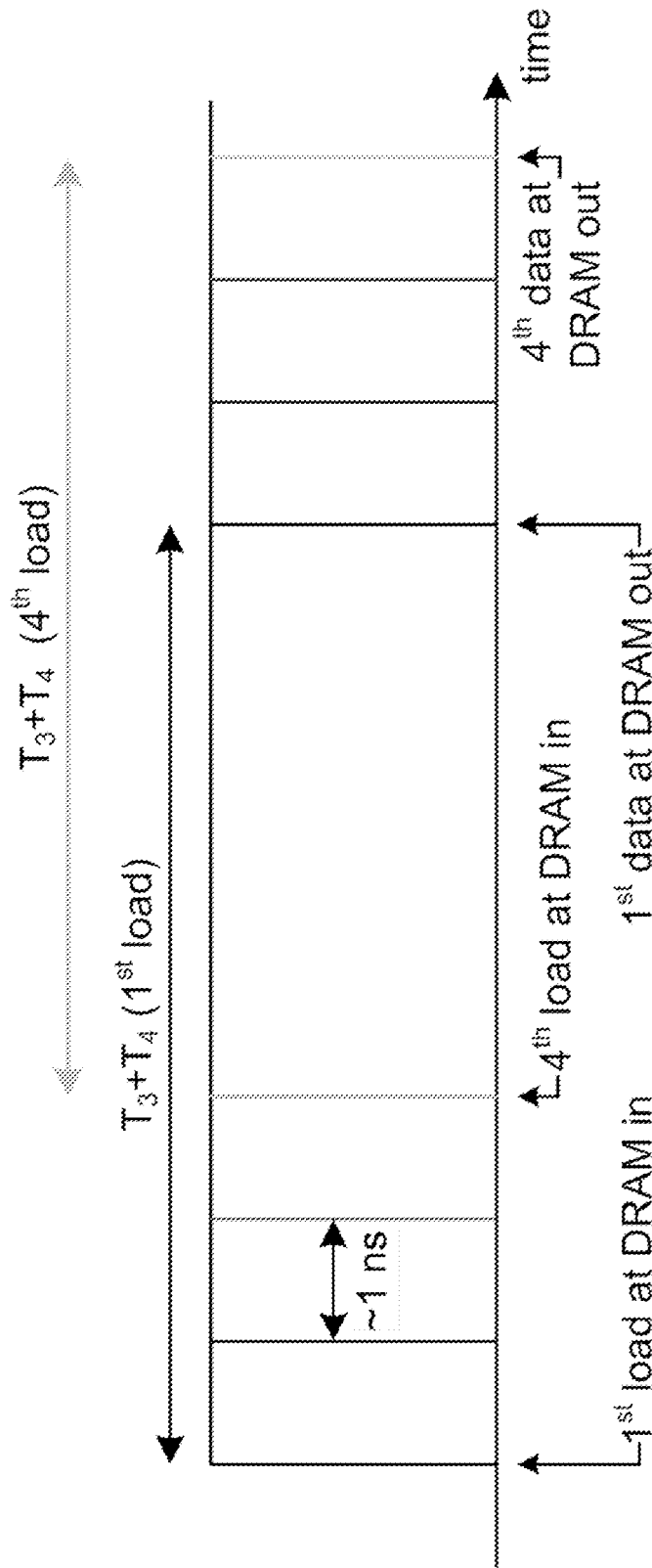
FIG. 5 illustrates the timing for the group of four load requests to flow through the DRAM, according to some embodiments of this disclosure.

FIG. 5 shows the timing is shown for a group of four load requests through the DRAM. As above, the requests arrive at the DRAM spaced about 1 nsec apart. The assumptions are as follows: the requests go to different banks and so are processed in parallel inside the DRAM; small differential latencies from the load requests are ignored; and thus, data from responses appears at the DRAM output spaced about 1 nsec apart.

Figure 6:
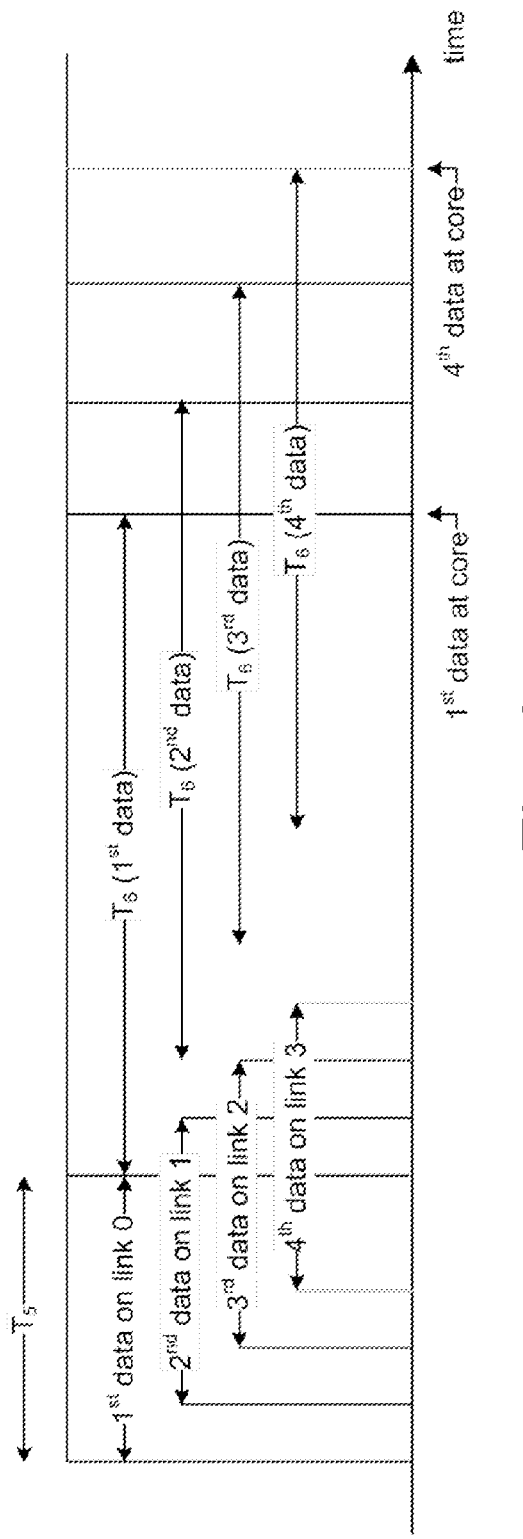
FIG. 6 illustrates the timing for response data to flow from the DRAM to the processor core, according to some embodiments of this disclosure.

FIG. 6 shows the timing in this example for a group of four responses from the DRAM to the core 130. The responses may be sent in parallel on the four links between the DRAM and the processor chip 120, spaced about 1 nsec apart. In this example, the responses are serialized between the memory interface 140 and the fabric inside the processor chip 120. In this example, it takes 2 nsec per response through the processor chip. Thus, there are gaps between response arrivals from the DRAM and forwarding the data through the processor chips. As a result, queuing may be performed at this interface.

For the next four requests in the group, there may be a new completed response at the processor chip once every processor cycle, e.g., 1 nsec in this example, given the processor clock speed in this example. There may be a newly completed response at the core that issued the requests every two processor cycles, e.g., 2 nsec in this example.

As shown in FIGS. 4-6, the aggregate latency for a group of N requests in this example is thus $T_1+T_2+T_3+T_4+T_5+T_6+2(N-1)\ t_c$, where $t_c$ is the period of the processor chip's clock. Thus, an optimum number of requests $N_{opt}$ per group may be determined such that, if the average time to process the results of a request is $T_P$, then $N_{opt}*T_P=T_1+T_2+T_3+T_4+T_5+T_6+2(N_{opt}-1)\ t_c$. In some embodiments, this optimum number of requests per group may be determined dynamically, but may also be determined offline.

Generalizing the above example, the optimum number of load requests per group may be based on various factors, including, for example, the quantity of processor cores and thus threads issuing load requests; ratios of processor core clock, chip infrastructure clock, and DRAM link frequencies; the location of the serialization point for data returned by the requests; and other factors. The optimum number of load requests per group may be further based on hash table structure, processing per hash probe, or both, each of which may be query-dependent.

Some embodiments of the join system 100 may determine the optimum group size offline. To this end, the join system 100 may do one or more of following, which may be implemented through use a simple queuing model to do one or more of the following: estimate the aggregate latency of a group of load requests issued by a single thread, where latency is the time between issuance and receiving a response; identify the dependence of the aggregate latency on the number of requests in the group; and thus provide an estimate for the optimum number of requests in the group.

Figure 7:
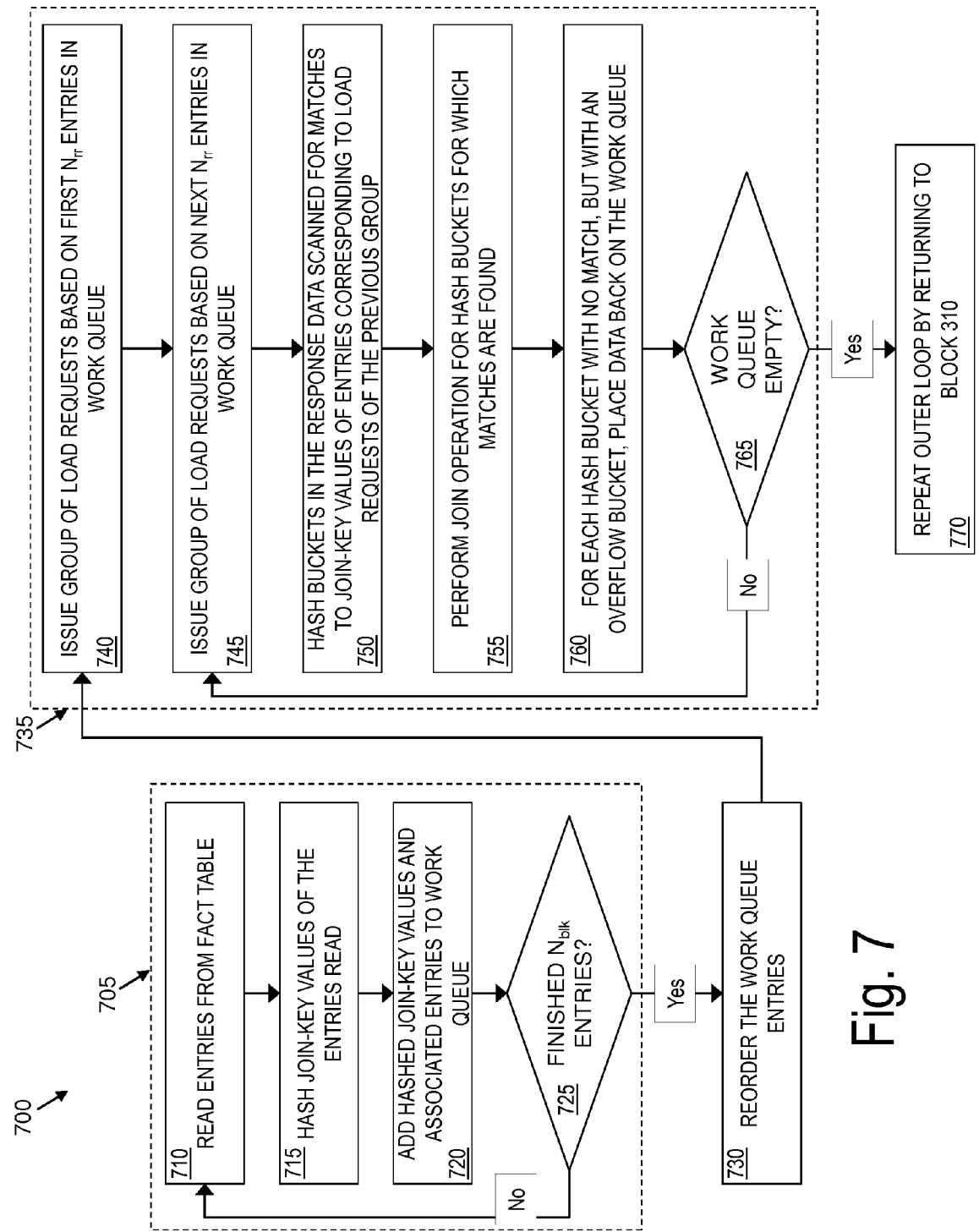
FIG. 7 is a flow diagram of a method for a probe phase of a hash join, according to some embodiments of this disclosure.

FIG. 7 is a flow diagram of a method 700 for the probe phase of a hash join, according to some embodiments of the join system 100. Specifically, the flow diagram represents the outer loop of an algorithm for organizing the probe phase. Each pass through the outer loop has two phases, or sub-phases, with each sub-phase employing its own inner loop. The first sub-phase 705 of the probe phase may include blocks 710-725, and the second sub-phase 735 may include blocks 740-765. After completion of the second phase, at block 777, the outer loop may repeat by returning to the first sub-phase 705.

In FIG. 7, the following parameters are used: $N_{ft}$ represents the number of entries in the fact table, and thus also the total number of probes into the hash table. $N_{blk}$ represents the number of entries read from the fact table and processed by the algorithm for each pass through the outer loop (e.g., a reasonable value may be 1024). $N_{rr}$ represents the number of load requests issued as a group in each pass through the inner loop of the second sub-phase (e.g., reasonable values may be 8 and 16).

Within the first sub-phase 705, at block 710, entries may be read from the fact table, where each entry may include a join-key value and a payload representing one or more values in the corresponding row of the fact table. At block 715, the join-key values may be hashed, resulting in hash-bucket addresses. At block 720, the hash-bucket addresses and associated entries may be added to the work queue. At decision block 725, it is determined whether $N_{blk}$ entries have been read in the current inner loop. If not, then the method 700 may return to the beginning of the first sub-phase 705, specifically, to block 710. If the desired number of entries have been read already, then the method 700 may leave the first sub-phase 705. The computation in the inner loop of the first sub-phase may 705 be parallelized in various ways, but the specifics of such parallelization are outside the scope of this disclosure.

At block 730, in some embodiments, the work queue entries may be reordered between execution of the first sub-phase 705 and the second sub-phase 735. The partitioning of work into two sub-phases 705 and 735 may provide an additional advantage over conventional join systems, through this reordering of block 730.

For example, a particular implementation of the join system 100 makes sixteen requests at a time. Further, in this particular implementation, there is probability P that two requests in the same group correspond to fact-table entries having hashed join-key values matching the same hash bucket, where P is greater than zero and may be significant. Thus, on some occasions, two requests in the same group may cause a hash collision, where the requests result in the same hash bucket. In this case, it can take two cycles for the results of these two requests to be returned, as these results cannot be returned in parallel in a single cycle. If more than two requests result in the same hash bucket, the latency to return results becomes even larger. Further, if hash collisions occur regularly with groups of requests, this may drastically increase the latency and the total time needed to complete the probe phase.

However, by reordering the work queue entries at block 730, some hash collisions may be avoided. For example, the reordering may ensure that an upcoming group of requests includes no or few entries with matching hashed join-key values, by selecting which requests are at the top of the work queue or positioned near one another in the work queue. Thus, the reordering at block 730 may also be considered a manner of selecting which requests end up in which groups. Because the reordering takes time, there may be a trade-off between the time spent reordering and the time saved by avoiding hash collisions. Thus, the reordering of block 730 may be reduced or increased as desired by a manager of the join system 100.

Thus, reordering entries in the work queue based on scanning the set of hash-bucket addresses in the queue entries may avoid such hash collisions or other latency-impacting events. The reordering may be enabled by partitioning the work into two sub-phases with a sufficiently large value for $N_{blk}$.

Within the second sub-phase 735, at block 740, a group of $N_{rr}$ load requests may be issued to the hash table based on the first $N_{rr}$ addresses in the work queue. At block 745, the next group of $N_{rr}$ load requests may be issued to the hash table based on the next $N_{rr}$ addresses in the work queue. While the join system 100 is waiting on responses to this next group of load requests, it may process the responses from the previous load requests. At block 750, the hash buckets returned in the response data for the previous group of load requests may be scanned for matches to the join-key values of entries corresponding to the load requests of the previous group. At block 755, joins may be performed for the hash buckets for which matches are found. At block 760, for each remaining bucket with no matches, if an overflow hash bucket exists, appropriate entries may be added back to the work queue. Specifically, for each applicable fact table entry, the data added back to the work queue may include one or more of the associated key value, the payload from the fact table entry, and the address of the overflow hash bucket. At decision block 765, it may be determined whether the work queue is empty. If not, then the method 700 may return to block 745 to issue another group of load requests. If the work queue is empty, then the method 700 may exit the second sub-phase 735.

There may be an explicit parallelization of the computation in the inner loop of the second sub-phase 735, in that groups of $N_{rr}$ load requests are issued, where each group is treated as a unit instead of as an individual. Consequently, each pass through the second sub-phase's inner loop may involve work to process the $N_{rr}$ hash buckets returned by the group of load requests issued in the previous pass through the inner loop. This work may be parallelized in various ways. However, this disclosure focuses on the higher-level parallelization of the second sub-phase loop based on the load requests being issued in groups. As mentioned above, the group size, represented by $N_{rr}$, may be determined such that the latency for the group, given the characteristics of the DRAM with EIP 110, can be covered by useful work.

At block 770, the outer loop may repeat by returning to the first sub-phase, represented by block 705. The outer loop may execute for $N_{ft}/N_{blk}$ iterations, assuming for simplicity that this ratio is an integer.

The approach disclosed herein can provide significant performance benefits when executed on ordinary processors with traditional architectures and traditional programming models, given the availability of DRAM with EIP 110, without using special-purpose hardware accelerators or processors, such as GPUs, with non-traditional programming models, and without the need for extensive partitioning of the hash table to fit in caches. As noted above, using the techniques disclosed herein may enable the DRAM with EIP 110, which may be several gigabytes in size, to be treated as a cache. The embodiments described above can be generalized to many applications where there is sufficient parallelism available, as there is for hash-join procedures 160.

Figure 8:
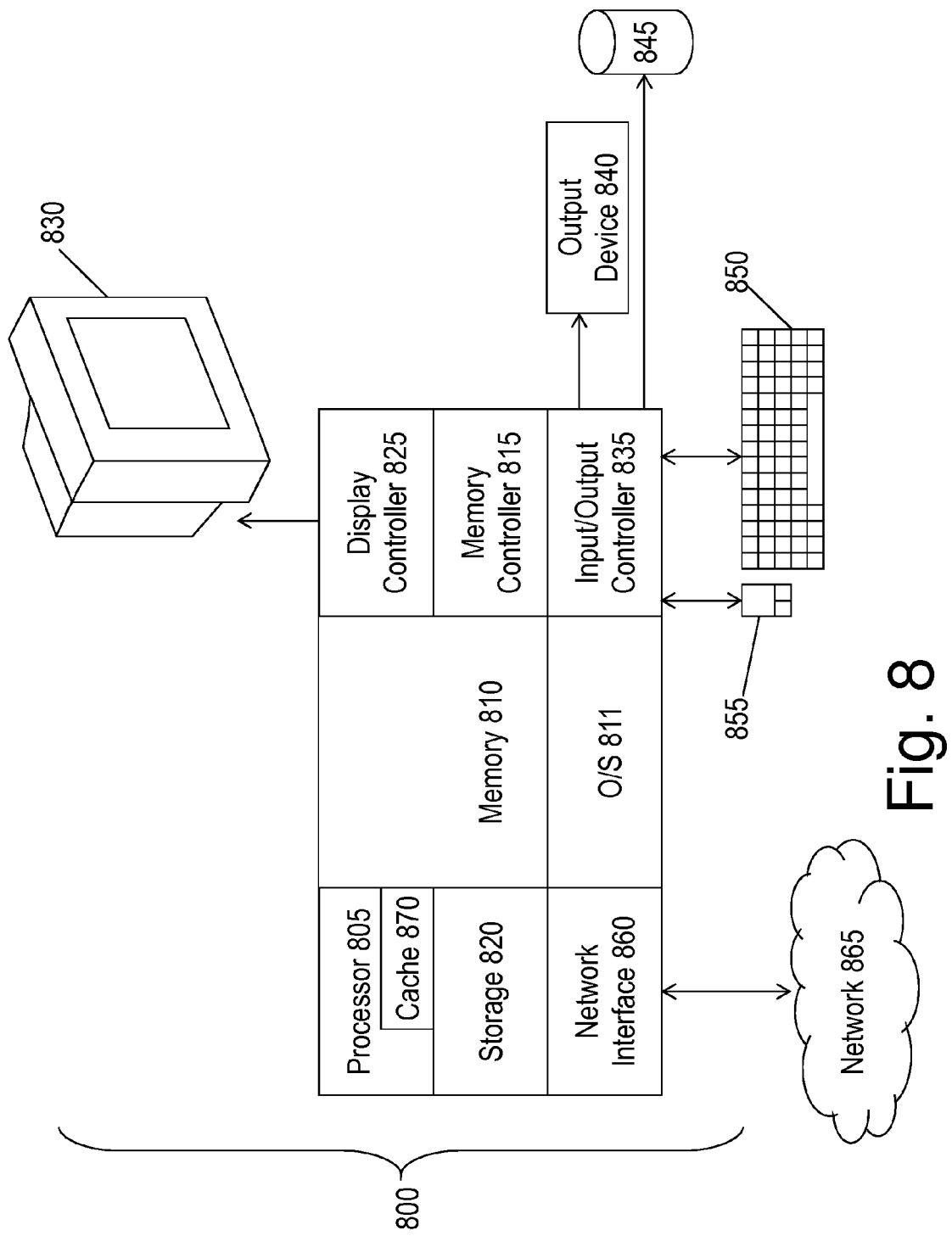
FIG. 8 is a block diagram of a computing device for implementing some or all aspects of the join system, according to some embodiments of this disclosure.

FIG. 8 illustrates a block diagram of a computer system 800 for use in implementing a join system or method according to some embodiments. The join systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 800, such as a personal computer, workstation, minicomputer, or mainframe computer.

In an exemplary embodiment, as shown in FIG. 8, the computer system 800 includes a processor 805, memory 810 coupled to a memory controller 815, and one or more input devices 845 and/or output devices 840, such as peripherals, that are communicatively coupled via a local I/O controller 835. These devices 840 and 845 may include, for example, a printer, a scanner, a microphone, and the like. A conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers, to enable communications.

The I/O devices 840, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 may be any custom made or commercially available processor, a central processing unit (CPU), an auxiliary processor among several processors associated with the computer system 800, a semiconductor based microprocessor (in the form of a microchip or chip set), a macroprocessor, or other device for executing instructions. The processor 805 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, etc.).

The memory 810 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). For instance, some embodiments may include DRAM with EIP, which may be used in implementing some aspects of the join system 100. Moreover, the memory 810 may incorporate electronic, magnetic, optical, or other types of storage media. Note that the memory 810 may have a distributed architecture, where various components are situated remote from one another but may be accessed by the processor 805.

The instructions in memory 810 may include one or more separate programs, each of which comprises an ordered listing of executable instructions for implementing logical functions. In the example of FIG. 8, the instructions in the memory 810 include a suitable operating system (OS) 811. The operating system 811 essentially may control the execution of other computer programs and provides scheduling, input-output control, file and data management, memory management, and communication control and related services.

Additional data, including, for example, instructions for the processor 805 or other retrievable information, may be stored in storage 820, which may be a storage device such as a hard disk drive or solid state drive. The stored instructions in memory 810 or in storage 820 may include those enabling the processor to execute one or more aspects of the join systems and methods of this disclosure.

The computer system 800 may further include a display controller 825 coupled to a display 830. In an exemplary embodiment, the computer system 800 may further include a network interface 860 for coupling to a network 865. The network 865 may be an IP-based network for communication between the computer system 800 and any external server, client and the like via a broadband connection. The network 865 transmits and receives data between the computer system 800 and external systems. In an exemplary embodiment, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

Join systems and methods according to this disclosure may be embodied, in whole or in part, in computer program products or in computer systems 800, such as that illustrated in FIG. 8.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    issuing, to a dynamic random access memory with extensive internal parallelism (DRAM with EIP), a first group of two or more load requests to load data from a hash table comprising one or more hash buckets, wherein the hash table is constructed from hashed join-key values of a dimension table for a hash-join procedure, and wherein each load request in the first group corresponds to an entry in a fact table of the hash-join procedure and seeks a hash bucket matching a hashed join-key value for the corresponding entry in the fact table;
    issuing, to the DRAM with EIP, a second group of two or more load requests to load data from the hash table;
    receiving, from the DRAM with EIP, first response data that is responsive to the first group of load requests, wherein the first response data comprises one or more hash buckets from the hash table; and
    processing, by a computer processor, the first response data while awaiting second response data that is responsive to the second group of load requests, wherein processing the first response data comprises:
    identifying matches between the join-key values corresponding to entries in the two or more load requests of the first group and the one or more hash buckets in the first response data;
    wherein the size of the second group of two or more load requests is selected such that a time for processing the first response data is based on the latency in receiving the second response data.

2. The method of claim 1, wherein issuing the first group of two or more load requests and issuing the second group of two or more load requests are performed on back-to-back processor cycles.

3. The method of claim 1, further comprising:
    reading two or more entries of the fact table;
    hashing a join-key value of each entry of the fact table; and
    adding the hashed join-key value of each entry of the fact table, along with associated data, to a work queue;
    wherein issuing the first group of two or more load requests comprises issuing load requests corresponding to two or more entries of the work queue.

4. The method of claim 3, further comprising sorting the work queue to dynamically reduce differential latencies for receiving response data that is responsive to two or more groups of load requests issued.

5. The method of claim 1, further comprising dynamically modifying the size of the second group of two or more load requests.

6. The method of claim 1, further comprising selecting the size of the second group of two or more load requests, wherein the selecting comprises:
    calculating an aggregate latency of a third group of two or more load requests issued by a single thread, wherein the aggregate latency is the time between issuing the third group of two or more load requests and receiving a response;
    identifying the dependence of the aggregate latency on the number of requests in the third group; and
    determining an optimum number of load requests in the second group based at least in part on the aggregate latency and the dependence of the aggregate latency on the number of requests in the third group.

* * * * *